US006944151B1

(12) United States Patent
Ménard

(10) Patent No.: US 6,944,151 B1
(45) Date of Patent: Sep. 13, 2005

(54) APPARATUS AND METHOD TO USE A CONVENTIONAL TELEPHONE SET TO MAKE TELEPHONE CALLS ON A PACKET NETWORK

(75) Inventor: François Ménard, Sherbrooke (CA)

(73) Assignee: Mediatrix Telecom, Inc. (CA)

( * ) Notice: Subject to any disclaimer, the term of this patent is extended or adjusted under 35 U.S.C. 154(b) by 0 days.

(21) Appl. No.: 09/154,431

(22) Filed: Sep. 16, 1998

(30) Foreign Application Priority Data

Sep. 16, 1997  (CA) .............................................. 2215681

(51) Int. Cl.[7] .............................................. H04L 12/66
(52) U.S. Cl. ..................................... 370/353; 370/356
(58) Field of Search ................................ 370/351–356, 370/463; 379/88.17, 900

(56) References Cited

U.S. PATENT DOCUMENTS

| | | | |
|---|---|---|---|
| 5,563,938 A | | 10/1996 | Soshea et al. |
| 5,654,957 A | | 8/1997 | Koyama |
| 5,661,785 A | | 8/1997 | Carpenter et al. |
| 5,726,984 A | * | 3/1998 | Kubler et al. ............... 370/349 |
| 5,742,596 A | * | 4/1998 | Baratz et al. ............... 370/356 |
| 5,751,706 A | | 5/1998 | Land et al. |
| 5,892,764 A | * | 4/1999 | Riemann et al. ............ 370/401 |
| 5,915,008 A | * | 6/1999 | Dulman ........................ 379/201 |
| 5,978,469 A | * | 11/1999 | Benson ........................ 379/377 |
| 6,078,582 A | * | 6/2000 | Curry .......................... 370/356 |
| 6,169,734 B1 | | 1/2001 | Wilson ........................ 370/352 |
| 6,233,234 B1 | * | 5/2001 | Curry .......................... 370/356 |
| 6,240,085 B1 | * | 5/2001 | Iwami et al. ................ 370/352 |
| 6,295,293 B1 | * | 9/2001 | Tonnby et al. .............. 370/389 |
| 6,307,853 B1 | * | 10/2001 | Storch et al. ................ 370/354 |
| 6,671,272 B2 | * | 12/2003 | Vaziri et al. ................. 370/352 |

FOREIGN PATENT DOCUMENTS

| | | |
|---|---|---|
| FR | 2753 862 | 9/1996 |
| WO | PCT/CA95/00147 | 3/1995 |
| WO | PCT/CA96/00460 | 7/1996 |
| WO | PCT/US/97/16504 | 9/1997 |

OTHER PUBLICATIONS

1997 Elsevier Science B.V., Microprocessors and Microsystems 21 (1997) 213–221.

S. Foo et al., "A Telephone Adapter for Internet Telephony Systems".

Adam Raney, "VoIP and the 9–1–1 Solution," Dec. 12, 2003.

* cited by examiner

Primary Examiner—Ricky Ngo
Assistant Examiner—Duc Duong
(74) Attorney, Agent, or Firm—Swidler Berlin LLP

(57) ABSTRACT

An apparatus and a method to use a telephone set to place telephone calls on a packet network and to route telephone calls between a telephone set, a telephone line, Local Area Network and packet network interfaces of the apparatus. More specifically, the apparatus may include one or more telephone set interfaces, one or more telephone line interfaces, a Local Area Network interface and a packet network interfaces. Use is made of an embedded software agent located inside the apparatus to, among other things, select which interfaces to use on the apparatus to make telephone calls. The software agent takes decisions based on a set of preestablished routing rules that are computed by the apparatus or obtained from a network server.

34 Claims, 6 Drawing Sheets

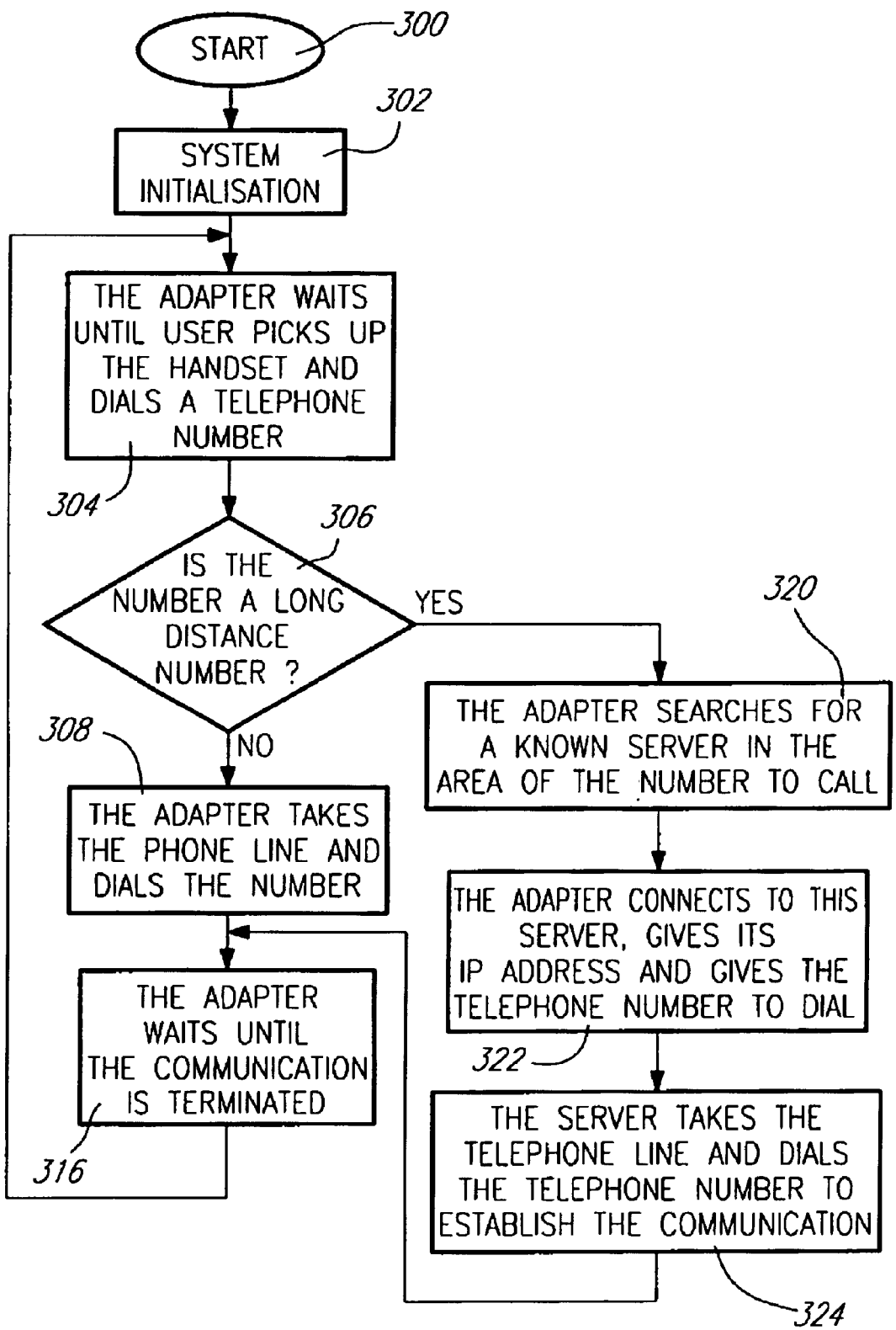

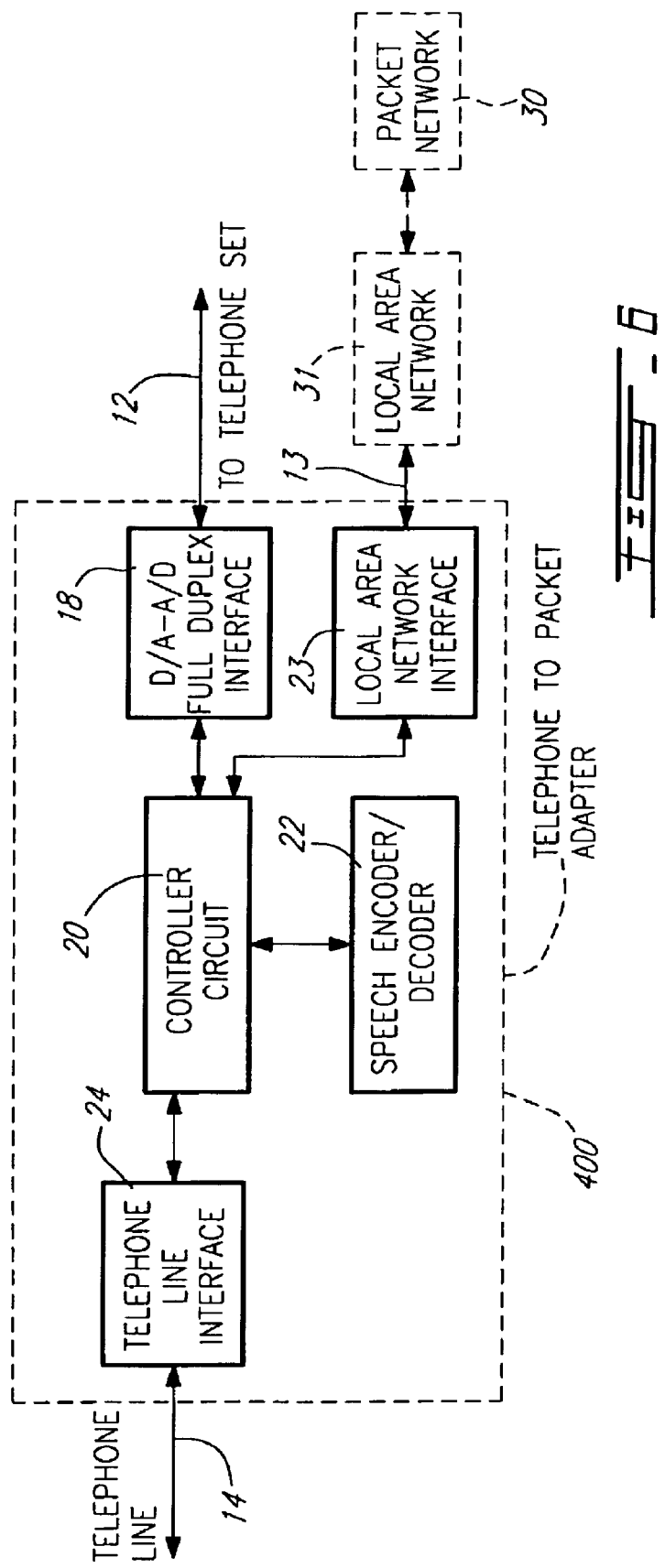

APPARATUS AND METHOD TO USE A CONVENTIONAL TELEPHONE SET TO MAKE TELEPHONE CALLS ON A PACKET NETWORK

FIELD OF THE INVENTION

The present invention relates to packet networks. More specifically, the present invention is concerned with a method and an apparatus to use a conventional telephone set to make telephone calls on a packet network.

BACKGROUND OF THE INVENTION

The prior art is replete with software enabling a first user to establish a telephone-like conversation with a second user running the same software via a packet network, such as, for example, the Internet.

These softwares usually run on personal computers equipped with microphones to capture the sounds and with sound cards to reproduce the sounds from the other user. The software therefore captures the sound from a first user, digitises it, compresses it, and forwards it to the Packet Network address (Internet Protocol address or IP address) of the second user. The sounds is then uncompressed, transferred back to analog sound by the sound card and reproduced on the premises of the second user. Of course, these steps are performed bidirectionally to result in a full duplex connection.

The drawbacks of the above mentioned software system are multiple. For example, a dedicated PC must be used as a telephone, both users must be similarly equipped and running the same software and it is not possible to reach users equipped with conventional telephones.

OBJECTS OF THE INVENTION

An object of the invention is to provide an apparatus and a method to use a conventional telephone set to make telephone calls on a packet network.

SUMMARY OF THE INVENTION

More specifically, in accordance with the present invention, there is provided a telephone to packet adapter comprising:

a telephone line interface configured to be connected to a telephone line;

a telephone interface configured to be connected to a telephone set;

a Local Area Network interface configured to be connected to a packet network;

a controller circuit interconnecting the telephone line interface, the telephone interface and the Local Area Network interface; the controller circuit being so configured as to route the telephone interface to one of the telephone line and the Local Area Network interfaces depending on at least one preestablished routing rule.

According to another aspect of the present invention, there is provided a telephone to packet adapter comprising:

a telephone line interface configured to be connected to a telephone line;

a telephone interface configured to be connected to a telephone set;

a Local Area Network interface configured to be connected to a Local Area Network;

a packet network interface configured to be connected to a packet network; and a controller circuit interconnecting the telephone line interface, the telephone interface, the Local Area Network interface and the packet network interface; the controller circuit being so configured as to either a) route the telephone interface to one of the telephone line and the packet network interfaces and b) route the Local Area Network interface to one of the telephone line and the packet network interfaces depending on at least one preestablished routing rule.

According to another aspect of the present invention, there is provided a method for routing telephone calls to a packet network via a telephone to packet adapter provided with a telephone line interface, a telephone interface, a Local Area Network interface and a controller circuit interconnecting the telephone line, telephone and Local Area Network interfaces; the method comprising the steps of:

connecting a telephone line to the telephone line interface;

connecting a telephone set to the telephone interface;

connecting a packet network to the Local Area Network interface;

running an agent software for routing the telephone interface to either the conventional telephone line interface and the Local Area Network interface depending on at least one preestablished routing rule.

According to yet another aspect of the present invention, there is provided a method for routing telephone calls to a packet network via a telephone to packet adapter provided with a telephone line interface, a telephone interface, a Local Area Network interface, a packet network interface and a controller circuit interconnecting the telephone line, telephone, packet network and Local Area Network interfaces; the method comprising the steps of:

connecting a telephone line to the telephone line interface;

connecting a telephone set to the telephone interface;

connecting a Local Area Network to the Local Area Network interface;

connecting a packet network interface to the packet network interface;

running an agent software for routing either a) the telephone interface to one of the conventional telephone line interface and the packet network interface, and b) the Local Area Network interface to one of the conventional telephone line interface and the packet network interface, depending on at least one preestablished routing rule.

It is to be noted that the term "telephone call" is to be construed as meaning any calls conventionally made via telephone lines such as, for example, voice calls, fax calls and modem calls, Accordingly, the term "telephone set" is to be construed as meaning any device that produces signals capable of being understood by PSTN equipment expected signals from a conventional telephone set (also known, as a POTS (Plain Old Telephone System) telephone set). Therefore, the term "telephone set" includes any POTS devices such as, for example, fax machines, modems and even more advanced devices such as H.324 video phones.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 5 is a flow diagram illustrating the general steps taken to establish a communication between one of users 1 or 2 and user 3 of FIG. 2; and FIG. 6 is a schematised block diagram illustrating the various components of a telephone to packet adapter according to a second embodiment of the present invention.

DESCRIPTION OF THE PREFERRED EMBODIMENTS

Figure 1:
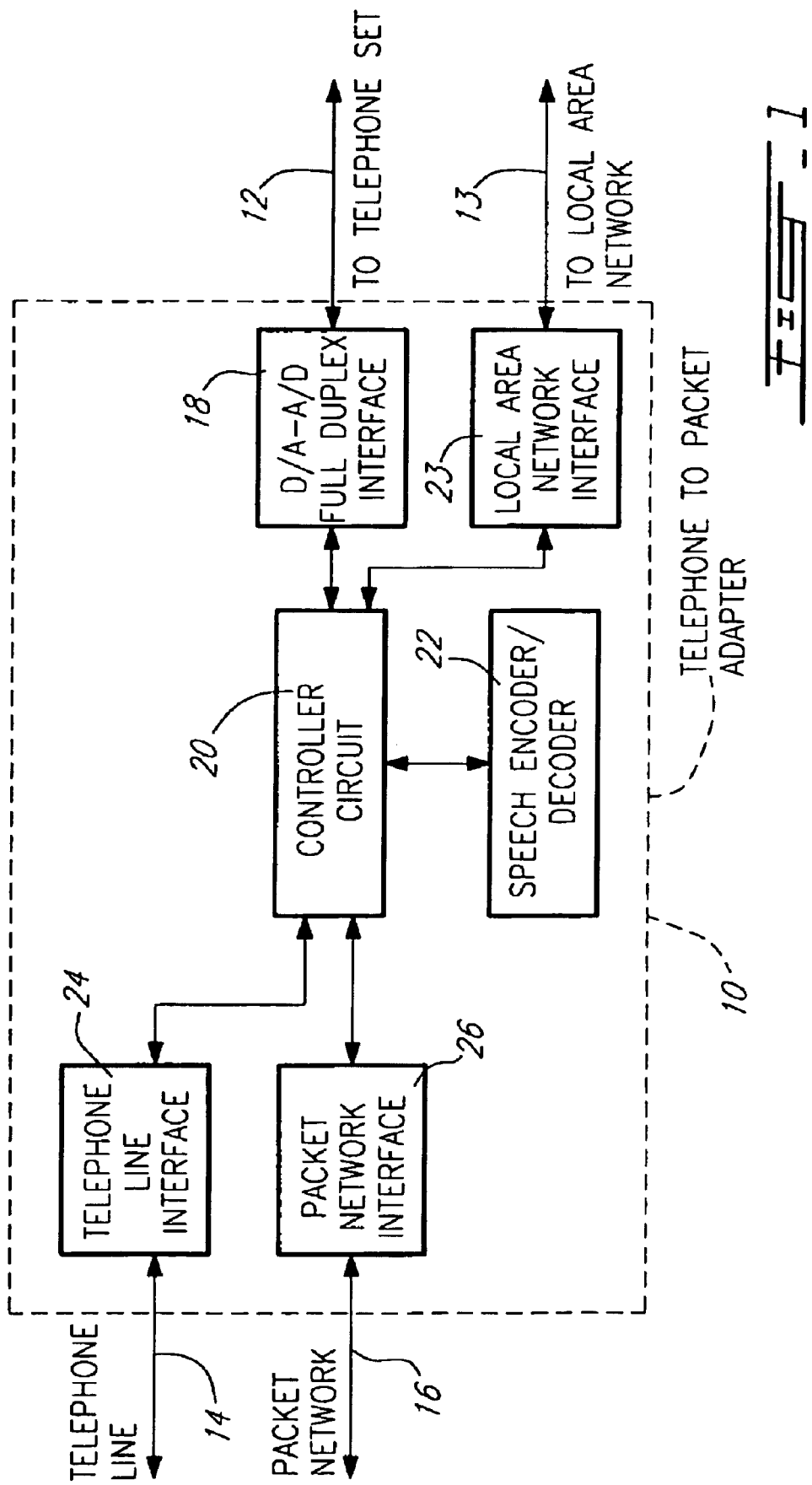
FIG. 1 is a schematised block diagram illustrating the various components of a telephone to packet adapter according to a first embodiment of the present invention.

FIG. 1 of the appended drawings illustrates a block diagram of a full duplex telephone to packet adapter 10 according to a first embodiment of the present invention.

The adapter 10 includes a telephone input/output (IO) port 12 to which a conventional telephone (not shown) may be connected, a Local Area Network (LAN) IO port 13 trough which connectivity to a LAN or to a Personal Computer (PC) (not shown) is obtained, a telephone line IO port 14 to which a telephone line (not shown), part of the Public Switched Telephone Network (PSTN), may be connected and a packet network interface IO port 16 to which a packet network (not shown) may optionally be connected.

The adapter 10 electronic circuitry generally includes an analog to digital (A/D) and a digital to analog (D/A) full duplex interface 18 interconnecting a controller circuit 20 and the IO port 12, a Local Area Network interface 23 interconnecting the controller circuit 20 and the IO port 13, a speech encoder/decoder 22 connected to the controller circuit 20, a telephone line interface 24 interconnecting the controller circuit 20 and the IO port 14 and a packet network interface 26 interconnecting the controller circuit 20 and IO port 16.

The controller circuit 20 is provided with a central processing unit (CPU) and sufficient memory to store a software agent program and other data stored in databases as will be further described hereinafter.

The speech encoder/decoder 22 includes the required circuitry to perform digital speech and/or data encoding and decoding to decrease the bandwidth required to transfer the information from one user to another and to recuperate the complete information after the transfer.

It is believed within the reach of one skilled in the art to provide adequate electronic circuitry for the elements 18–26 described hereinabove.

Turning now briefly to FIG. 6 of the appended drawings, a telephone to packet adapter 400 according to a second embodiment of the present invention will be described.

The telephone to packet adapter 400 is very similar to the telephone to packet adapter 10 described hereinabove. Thus, for concision purposes, only the differences between these adapters will be described herein.

As can be seen from FIG. 6, the telephone to packet adapter 400 is designed to be connected to a packet network 30 via a Local Area Network 31. Thereby, the telephone to packet adapter 400 does not require a packet network interface 26 (FIG. 1). It is to be noted that the Local Area Network 31 therefore includes a packet network LAN gateway as is very well known in the art.

Figure 2:
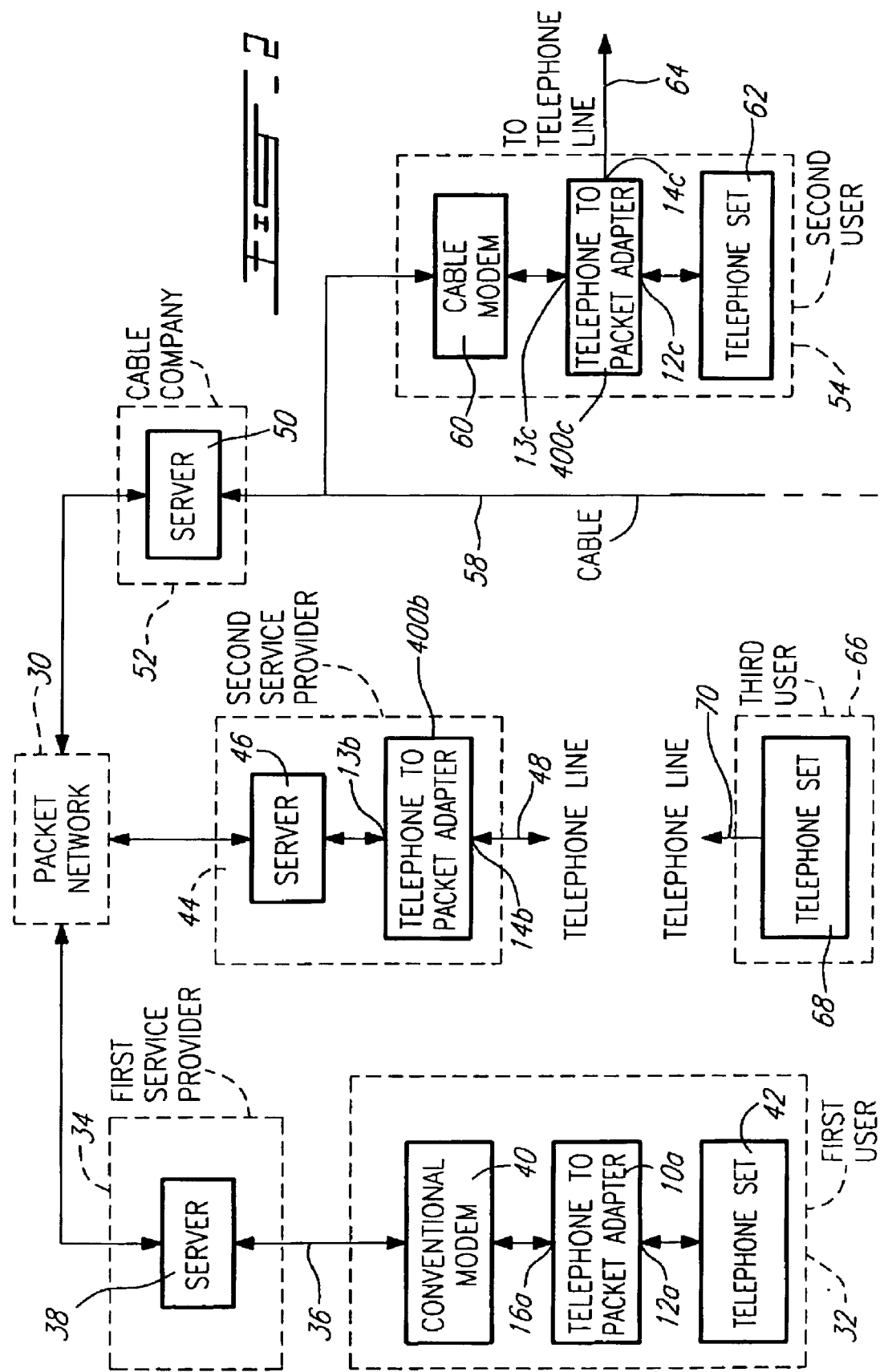
FIG. 2 is a schematised block diagram illustrating a packet network where users are provided with telephone to packet adapters according to an embodiment of the present invention.

FIG. 2 of the appended drawings illustrates a packet network 30, for example, the Internet, to which the users are connected via telephone to packet adapters 10 or 400. It is to be noted that FIG. 2 will be further described hereinafter with a view to illustrate some of the various possibilities of the telephone to packet adapters 10 and 400.

A first user 32 is connected to the packet network 30 via a first service provider 34 and a telephone line 36. The first service provider 34 has a conventional Network Access Server 38 provided with conventional modems (not shown) to interconnect its clients, for example first user 32, to the packet network 30. The first user 32 has a telephone to packet adapter 10a, a.conventional modem 40 connected to the packet network I0 port 16a, and a telephone set 42 connected to the telephone I0 port 12a. It is to be noted that both the Local Area Network port 14 (not shown) and the Local Area Network port 13a of the adapter 10a are not used.

It is to be noted that the telephone set 42 could be replaced by a Local Area Network (not shown) connected to the Local Area Network port 13a to therefore enable telephone calls, for example, modem calls, from the Local Area Network to be routed to the packet network 30.

FIG. 2 also illustrates a second service provider 44 connected to the packet network 30 via an Internet server 46 and including a telephone to packet adapter 400b interconnecting the Internet server 46 and a telephone line 48, the purpose of which will be described hereinafter with reference to FIG. 5. More specifically, the server 46 is connected to the Local Area Network IO port 13b of the telephone to packet adapter 400b and the telephone line 48 is connected to the IO port 14b of the telephone to packet adapter 400b. It is to be noted that the IO port 12b is not used.

Of course, the telephone to packet adapter 400b of FIG. 2 could advantageously be provided with more than one telephone line I0 ports 14b allowing the telephone to packet adapter 10b to be connected to more than one telephone line. Indeed, this would allow the second service provider 44 to interconnect more than two users simultaneously.

It is also to be noted that the telephone to packet adapter 400b of FIG. 2 could be replaced by a telephone to packet adapter 10 as illustrated in FIG. 1. If this is the case, the packet network IO port 16 will not be used.

The packet network 30 is also connected to a server 50 of a cable company 52 providing Internet services to its clients, for example second user 54, via a conventional television cable 58 connected to the server 50 via adequate circuitry (not shown) known in the art.

The second user 54 is equipped with a cable modem 60 connected to the conventional television cable 58 and a telephone to packet adapter 400c interconnecting the cable modem 60 and a telephone set 62. The telephone to packet adapter 400c is also connected to a telephone line 64. More specifically, the cable modem 60 is connected to the Local Area Network IO port 13c, the telephone 62 is connected to the IO port 12c and the telephone line 64 is connected to the IO port 14c. The telephone to packet adapter 400c therefore considers the cable modem 60 as a Local Area Network interconnecting the telephone to packet adapter 400 to the packet network 30.

Finally, FIG. 2 also illustrates a third user 66 equipped with a telephone set 68 connected to a conventional telephone line 70.

Figure 3:
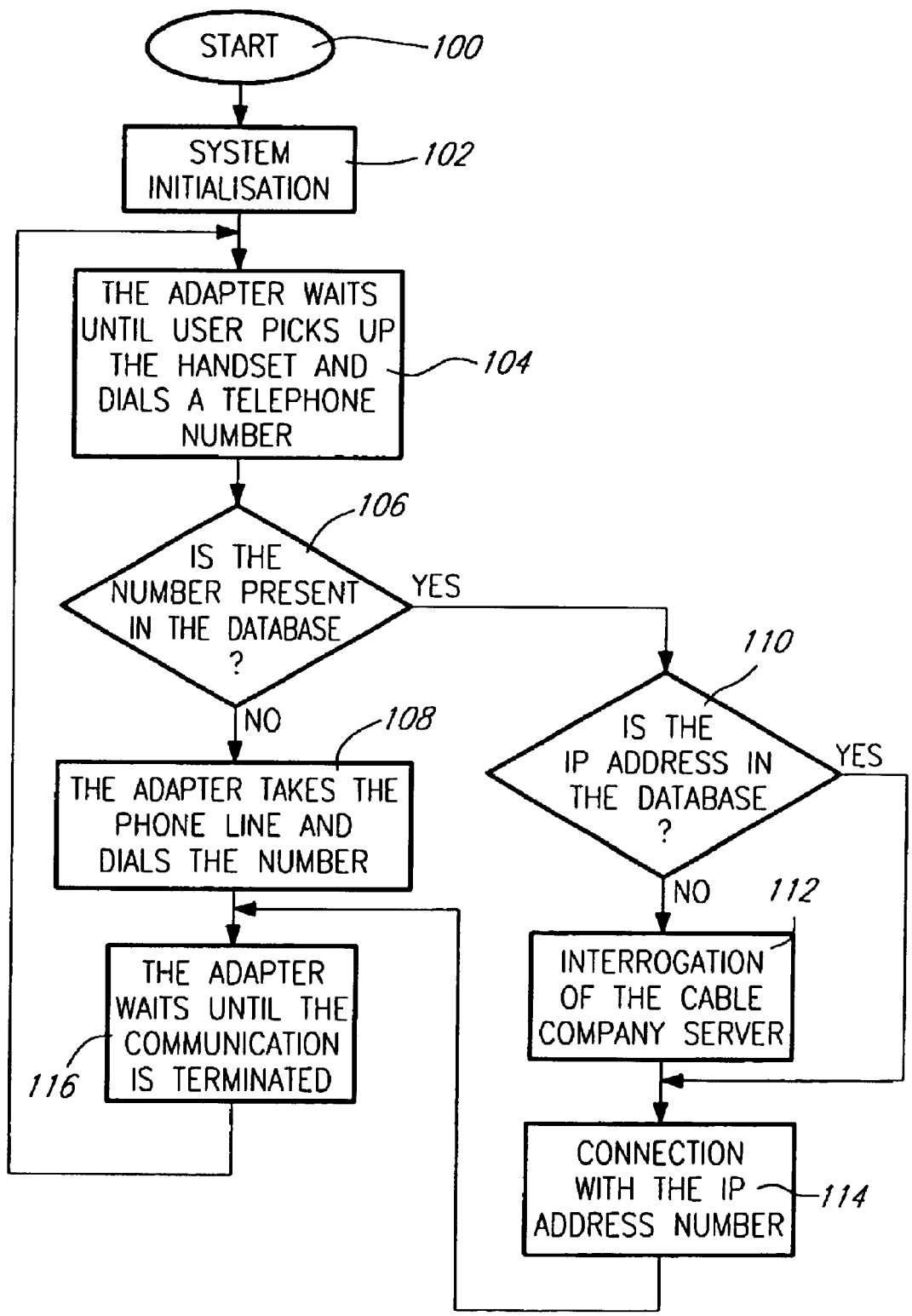
FIG. 3 is a flow diagram illustrating the general steps taken to establish a communication between user 2 and one of users 1 or 3 of FIG. 2.
Figure 4:
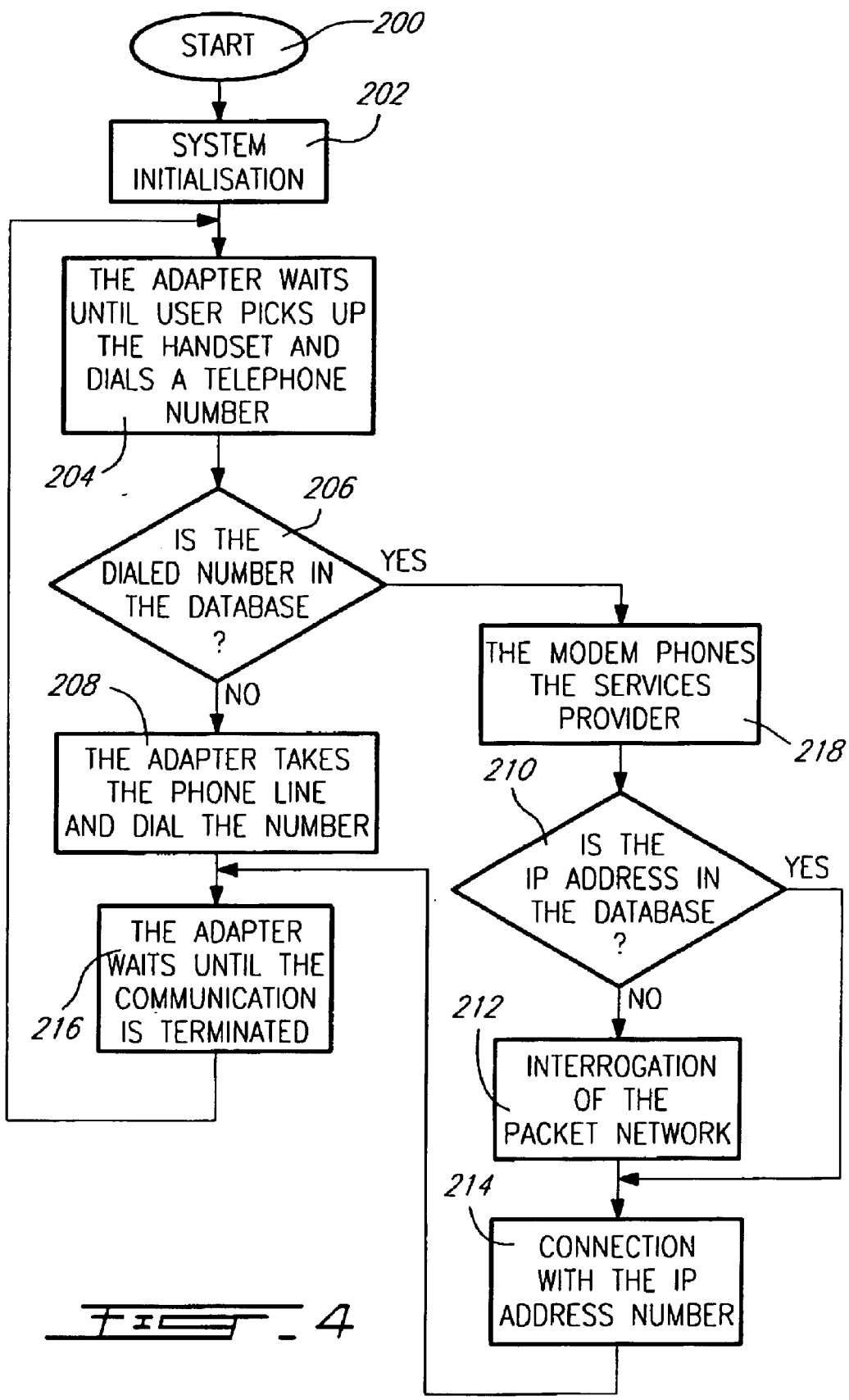
FIG. 4 is a flow diagram illustrating the general steps taken to establish a communication between user 1 and user 2 of FIG. 2.

Turning now to FIGS. 3–5, three different methods of use of the telephone to packet adapters 10 and 400 will be described.

FIG. 3 generally illustrates the steps taken when the second user 54 wants to reach another person.

After the telephone to packet adapter 400c is started (step 100) and initialised (step 102), the system waits until the second user 54 picks up the handset of the telephone set 62 and dials a telephone number (step 104).

The agent software of the telephone to packet adapter 400c then verifies if the dialled telephone number is present in a database contained in the controller circuit 20 (FIG. 6) (Step 106). This database contains a list of the telephone numbers that may be accessed via the packet network 30.

If the dialled telephone number may not be accessed via the packet network 30, the agent software of the telephone to packet adapter 400c routes the telephone set 62 to the telephone line 64 and dials the telephone number (step 108). The telephone number must therefore be conventionally dialled over a telephone line to establish the connection. This will be the case, for example, when the number dialled is local or when there is no service provider similar to the second service provider 44 in the area of the number dialled.

If the dialled number is present in the database, the agent software then determines if the IP address corresponding to this telephone number is in its database (step 110). If it is not the case, the agent software interrogates the Internet server 50 of the cable company 52 (or any other server having a correspondence table between IP addresses and telephone numbers) to find the required IP address (step 112). When this is done, the agent software establishes the connection between the second user 54 and the other user (for example the first user 32) (step 114).

The two connected users may then communicate normally in full duplex since the conversation is bidirectionally digitised, transformed into packets and transferred via the packet network 30 to the other user where it is converted back into an analog signal and supplied to the handset. Indeed, if the second user 54 is in communication with the first user 32, the telephone to packet adapter 10a will convert back the packets to an analog signal. Similarly, if the second user 54 calls the third user 66, the telephone to packet adapter 400b will do the required conversion.

The telephone to packet adapter 400c then waits until the communication is broken (step 116) and then returns to step 104.

An advantage of the above mentioned set of preestablished rules is that the second user 54 may either be transparently in communication with conventional telephone users and users of the present invention. Another advantage, is the possibility to route all the calls to the telephone line 64 should the connection to the packet network 30 via the cable company 52 be inactive, therefore providing a PSTN fallback.

It is to be noted that instead of using the telephone set 62, the second user could connect a LAN (not shown) to the IO port 13c and connect the cable modem 60 to the LAN to therefore call another user similarly equipped through the steps described hereinabove.

FIG. 4 of the appended drawings generally illustrates the steps taken when the first user 32 wants to reach another user.

Each step 200, 202, 204, 206, 208, 210, 214 and 216 is respectively identical to corresponding step 100, 102, 104, 106, 108, 110, 114 and 116 of FIG. 3. Thus, for concision purposes, the description of these steps will not be repeated hereinbelow.

Since the first user is not connected to the Internet via a cable company, the Internet server 38 of the first Internet service provider 34 (or any other server having a table of the IP addresses vs telephone numbers) is interrogated in step 212.

A step 218 has been added between step 206 and 210 to instruct the modem 40 to connect to the service provider 34.

Therefore, according to the above-described set of rules, the telephone line interface 24 is routed to the PSTN if the dialled number is not in the database and routed to the packet network if the dialled number is in the database Again, it is to be noted that instead of using the telephone set 42, the first user could connect a PC (not shown) or a LAN (not shown) to the IO port 13 and call another user similarly equipped through the steps described hereinabove.

Finally, FIG. 5 of the appended drawings illustrates another use of the telephone to packet adapter 10 of FIG. 1. This application is advantageous to reduce the long distance costs of the user.

The general principle is to detect if the telephone number dialled by the user is a long distance number and to do a routing of the call to a service provider (for example the second service provider 44 in FIG. 1) in the area of the telephone number to therefore prevent any long distance charges to the user if it is so. Of course the service provider 44 is equipped with a telephone to packet adapter 400b that may dial a local number via a telephone line 48.

Again, each step 300, 302, 304, 308 and 316 is identical to the corresponding step 100, 102, 104, 108 and 116 of FIG. 1 and described hereinabove. Thus, for concision purposes, the description of these steps will not be repeated hereinbelow.

In step 306, the telephone to packet adapter determines if the telephone number dialled is a long distance number. If this is not the case, step 308 is done as mentioned above.

If the telephone number dialled is a long distance number (for example the telephone number of the third user 66), the software agent of the telephone to packet adapter searches a database (located in the controller circuit 20 or in an Internet server) to find the IP address of a service provider equipped with a telephone to packet adapter (for example the second service provider 44) in the area of the telephone number dialled (step 320).

The telephone to packet adapter then connects with this service provider 44 gives its own IP address and the telephone number of the third user 66 (step 322).

The telephone to packet adapter 400b of the second service provider 44 then takes the telephone line 48 and dials the received telephone number to establish the communication with the third user (step 324).

Again, the use of the telephone to packet adapter 400 is transparent to the user since only one number is dialled. Also, the above-described set or preestablished rules enables the user of the present invention to communicate with a user of a conventional telephone.

It is to be noted that it would also be possible to make a local call to a user of a conventional telephone by using a local service provider equipped with a telephone to packet adapter to do local calls. This way, the second user 54, for example, would not require a conventional telephone line to either receive or place local calls since these calls could reach the second user 54 via the cable 58.

It is to be noted that modems could be integrated with the telephone to packet adapter 10.

It is also to be noted that the controller circuit 20 of the telephone to packet adapters 10 and 400 may generate a dial tone to locally simulate the conventional dial tone sent to the A/D D/A Full duplex interface 18. The aforementioned controller circuit 20 can also generate other types of dial tones such as, for example, audio files.

As will be easily understood by one skilled in the art, the agent software running in the controller circuit 20 of the telephone to packet adapters 10 and 400 may advantageously include supplementary features. For example, once an Internet server is interrogated to link an IP address to a telephone number, the control circuit 20 may keep this information in a database for future references in view of decreasing the required connection delays. Similarly, speed dial numbers may be assigned to such kept IP addresses.

Also, it is to be noted that the flow diagrams illustrated in FIGS. 3–5 are schematised and that actual flow diagrams would be a lot more complex and would include other rules for routing the calls. For example, if the telephone to packet adapter detects that an emergency number (911 in North America) has been dialled, it will automatically take the telephone line and dial this emergency number.

Furthermore, it is to be noted that the flow diagrams illustrated in FIGS. 3–5 are not mutually exclusive. Indeed, the software agent may determine how to route a call depending on the interfaces that are connected to external devices and on users preferences, for example.

Therefore, the software agent embedded in the controller circuit 20 is used to compute a route based on information acquired or stored locally as well as information acquired from a network server. A calling method is derived from these rules and is used to determine which interfaces will be involved in the process of completing the call. The appropriate route is triggered from the embedded software agent running in a central processing unit of the controller circuit 20. The embedded software agent may decide to exchange route information with an intelligence server located on the network in order to make optimal routing decisions. The embedded software agent will decide when it is appropriate to select whether to use the packet network interface or the telephone network interface to carry through a call. This method permits of using a dedicated connection to a packet network in the home as a mean for automatically diverting some telephone calls through a least cost route.

As will be easily understood by one skilled in the art the above-described invention provides many advantages, such as, for example:

the use of an alternative packet-switched network instead of a conventional telephone line to make telephone calls;

it does not impose on the end user a different usage habit;

it is fully transparent to the end user;

it is possible to concurrently transmit many types of data between users. For example, two users could be in a conversation via telephone sets hooked to respective IO ports 12 and transfer data from Personal Computers connected to respective IO ports 13; and it provides a PSTN fallback.

It is also to be noted that the telephone set hooked up to the apparatus sees the apparatus as its first telephone switch, which can potentially provide more services than the PSTN telephone switch, due to its connectivity to the packet network, the services offered in the packet network and due to the level of programmability that is possible in the apparatus.

As will be apparent to one skilled in the art, the telephone to packet adapters 10 and 400 may be designed to operate with any type of PSTN telephone line such as, for example, ISDN, HFC Cable Telephony, Wireless Local Loop, wireline, wireless digital or analogue.

Although the telephone to packet adapter 10 of FIG. 1 is shown provided with only one of each interfaces 18, 23, 24 and 26, it would be within the reach of one skilled in the art to design a telephone to packet adapter provided with more than one of these interfaces if required by a particular application.

Although the present invention has been described hereinabove by way of preferred embodiments thereof, it can be modified, without departing from the spirit and nature of the subject invention as defined in the appended claims.

What is claimed is:

1. A telephone to packet adapter for routing an outgoing call issued by a telephone set in a user's home, said adapter comprising:

a telephone line interface configured to be connected to a user's home telephone line;

a telephone interface configured to be connected to the telephone set;

a packet network interface configured to be connected to a packet network;

a controller circuit interconnecting said telephone line interface, said telephone interface and said packet network interface, wherein said controller circuit includes a telephone number database of telephone numbers that may be reached via the packet network said controller circuit being so configured as to route said outgoing call to one of said telephone line and said packet network interfaces depending on at least one preestablished routing rule;

wherein said at least one preestablished routing rule is such that a) said outgoing call is routed to said telephone line interface when a dialled telephone number is a local call and b) said outgoing call is routed to said packet network interface when the dialled telephone number is not a local call.

2. A telephone to packet adapter as recited in claim 1, wherein said packet network interface is a Local Area Network interface configured to be connected to said packet network via a Local Area Network.

3. A telephone to packet adapter as recited in claim 1, wherein said packet network interface is a Local Area Network interface configured to be connected to said packet network via a Local Area Network packet network gateway.

4. A telephone to packet adapter as recited in claim 1, wherein said controller circuit includes an embedded agent software controlling the routing of the outgoing call.

5. A telephone to packet adapter as recited in claim 1, wherein said at least one preestablished routing rule is such that said outgoing call is routed to said telephone line interface when a dialled telephone number is an emergency number.

6. A telephone to packet adapter as recited in claim 1, further including a speech encoder/decoder associated to said controller circuit to encode and decode data routed by said controller circuit.

7. A telephone to packet adapter for routing an outgoing call issued by a telephone set in a user's home, said adapter comprising:

a telephone line interface configured to be connected to a user's home telephone line;

a telephone interface configured to be connected to the telephone set;

a packet network interface configured to be connected to a packet network;

a controller circuit interconnecting said telephone line interface, said telephone interface and said packet network interface, wherein said controller circuit includes a telephone number database of telephone numbers that may be reached via the packet network said controller circuit being so configured as to route said outgoing call to one of said telephone line and said packet network interfaces depending on at least one preestablished routing rule;

wherein said at least one preestablished routing rule is such that said outgoing call is routed to said telephone line interface when no packet network address corresponding to a dialled telephone number exist.

8. A telephone to packet adapter for routing an outgoing call issued by a telephone set in a user's home, said adapter comprising:

a telephone line interface configured to be connected to a user's home telephone line;

a telephone interface configured to be connected to the telephone set;

a packet network interface configured to be connected to a packet network;

a controller circuit interconnecting said telephone line interface, said telephone interface and said packet network interface;

wherein said controller circuit includes a telephone number database of telephone numbers that may be reached via the packet network; said controller circuit being so configured as to route said outgoing call to one of said telephone line and said packet network interfaces depending on at least one preestablished routing rule such that a) said outgoing call is routed to said telephone line interface when a dialled telephone number is not present in said telephone number database and b) said outgoing call is routed to said packet network interface when the dialled telephone number is listed in said telephone number database.

9. A telephone to packet adapter for routing an outgoing call issued by a telephone set in a user's home, said adapter comprising:

a telephone line interface configured to be connected to a user's home telephone line;

a telephone interface configured to be connected to the telephone set;

a packet network interface configured to be connected to a packet network;

a controller circuit interconnecting said telephone line interface, said telephone interface and said packet network interface, wherein said controller circuit includes a telephone number database of telephone numbers that may be reached via the packet network wherein said controller circuit being so configured as to route said outgoing call to one of said telephone line and said packet network interfaces depending on at least one preestablished routing rule such that said outgoing call is routed to said telephone line interface when said packet network is inactive.

10. A telephone to packet adapter comprising:

a telephone line interface configured to be connected to a user's home telephone line;

a telephone interface configured to be connected to a telephone set;

a Local Area Network interface configured to be connected to a Local Area Network;

a packet network interface configured to be connected to a packet network; and a controller circuit interconnecting said telephone line interface, said telephone interface, said Local Area Network interface and said packet network interface; said controller circuit being so configured as to either a) route said telephone interface to one of said telephone line and said packet network interfaces or b) route said Local Area Network interface to one of said telephone line and said packet network interfaces, depending on at least one preestablished routing rule;

wherein said at least one preestablished routing rule is such that a) one of said telephone interface and said Local Area Network interface is routed to said telephone line interface when a dialled telephone number is a local call and b) one of said telephone interface and said Local Area Network interface is routed to said Local Area Network interface when the dialled telephone number is not a local call.

11. A telephone to packet adapter as recited in claim 10, wherein said controller circuit includes an embedded agent software controlling the routing of said telephone and Local Area Network interfaces.

12. A telephone to packet adapter as recited in claim 10, wherein said at least one preestablished routing rule is such that one of said telephone interface and said Local Area Network interface is routed to said telephone line interface when no packet network address corresponding to a dialled telephone number exist.

13. A telephone to packet adapter as recited in claim 10, wherein said at least one preestablished routing rule is such that one of said telephone interface and said Local Area Network interface is routed to said telephone line interface when a dialled telephone number is an emergency number.

14. A telephone to packet adapter as recited in claim 10, wherein said controller circuit includes a telephone number database of telephone numbers that may be reached via the packet network; said at least one preestablished routing rule is such that a) one of said telephone interface and said Local Area Network interface is routed to said telephone line interface when a dialled telephone number is not present in said telephone number database and b) one of said telephone interface and said Local Area Network interface is routed to said Local Area Network interface when the dialled telephone number is listed in said telephone number database.

15. A telephone to packet adapter as recited in claim 10, wherein said at least one preestablished routing rule is such that one of said telephone interface and said Local Area Network interface is routed to said telephone line interface when said packet network is inactive.

16. A telephone to packet adapter as recited in claim 10, further including a speech encoder/decoder associated to said controller circuit to encode and decode data routed by said controller circuit.

17. A method for routing a telephone call issued by a telephone set in a user's home via a telephone to packet adapter provided with a telephone line interface, a telephone interface, a packet network interface and a controller circuit interconnecting the telephone line, telephone and packet network interfaces, and wherein the controller circuit includes a telephone number database of telephone numbers that may be reached via the packet network said method comprising the steps of:

connecting a user's home telephone line to the telephone line interface;

connecting the telephone set to the telephone interface;

connecting the adapter to a packet network via the packet network interface;

running an agent software in the controller circuit for routing the telephone call to either the telephone line interface or the packet network interface depending on at least one preestablished routing rule;

wherein said at least one preestablished routing rule includes a long distance call routing rule; said long distance call routing rule dictates that the telephone interface is to be routed to the packet network interface when a number dialled onto the telephone set is a long distance call.

18. A routing method as recited in claim 17, wherein said packet network connecting step includes the substep of connecting a Local Area Network to the packet network interface.

19. A routing method as recited in claim 17, wherein said at least one preestablished routing rule includes a local call routing rule; said local call routing rule dictates that the telephone interface is to be routed to the telephone line interface when a number dialled onto the telephone set is a local call.

20. A routing method as recited in claim 17, wherein said at least one preestablished routing rule includes an emergency call routing rule; said emergency call routing rule dictates that the telephone interface is to be routed to the telephone line interface when a number dialled onto the telephone set is an emergency number.

21. A method for routing a telephone call issued by a telephone set in a user's home via a telephone to packet adapter provided with a telephone line interface, a telephone interface, a packet network interface and a controller circuit interconnecting the telephone line, telephone and packet network interfaces, and wherein the controller circuit includes a telephone number database of telephone numbers that may be reached via the packet network said method comprising the steps of:

connecting a user's home telephone line to the telephone line interface;

connecting the telephone set to the telephone interface;

connecting the adapter to a packet network via the packet network interface;

running an agent software in the controller circuit for routing the telephone call to either the telephone line interface or the packet network interface depending on at least one preestablished routing rule;

wherein said at least one preestablished routing rule includes a default routing rule; said default routing rule dictates that the telephone interface is to be routed to the telephone line interface when either a) a number dialled onto the telephone set has no corresponding packet network address or b) the packet network is inactive.

22. A method for routing a telephone call issued by a telephone set in a user's home via a telephone to packet adapter provided with a telephone line interface, a telephone interface, a packet network interface and a controller circuit interconnecting the telephone line, telephone and packet network interfaces, and wherein the controller circuit includes a telephone number database of telephone numbers that may be reached via the packet network said method comprising the steps of:

connecting a user's home telephone line to the telephone line interface;

connecting the telephone set to the telephone interface;

connecting the adapter to a packet network via the packet network interface;

running an agent software in the controller circuit for routing the telephone call to either the telephone line interface or the packet network interface depending on at least one preestablished routing rule;

wherein said at least one preestablished routing rule includes a database determined routing rule; said database determined routing rule dictates that a) the telephone interface is routed to the packet network interface when a number dialled onto the telephone set is present in the telephone number database of the controller circuit; and b) the telephone interface is routed to the telephone line interface when a number dialled onto the telephone set is not present in the telephone number database.

23. A method for routing outgoing telephone calls to a packet network via a telephone to packet adapter provided with a telephone line interface, a telephone interface, a Local Area Network interface, a packet network interface and a controller circuit interconnecting the telephone line, telephone, packet network and Local Area Network interfaces; said method comprising the steps of:

connecting a user's home telephone line to the telephone line interface;

connecting a telephone set to the telephone interface;

connecting a Local Area Network to the Local Area Network interface;

connecting a packet network interface to the packet network interface;

running an agent software for routing either a) the telephone interface to one of the telephone line interface and the packet network interface, or b) the Local Area Network interface to one of the telephone line interface and the packet network interface, depending on at least one preestablished routing rule.

24. A routing method as recited in claim 23, wherein said at least one preestablished routing rule includes a local call routing rule; said local call routing rule dictates that one of the telephone interface and the Local Area Network interface is to be routed to the telephone line interface when a number dialled onto the telephone set is a local call.

25. A routing method as recited in claim 23, wherein said at least one preestablished routing rule includes a long distance call routing rule; said long distance call routing rule dictates that one of the telephone interface and the Local Area Network interface is to be routed to the Local Area Network interface when a number dialled onto the telephone set is a long distance call.

26. A routing method as recited in claim 23, wherein said at least one preestablished routing rule includes a default routing rule; said default routing rule dictates that one of the:telephone interface and the Local Area Network interface is to be routed to the telephone line interface when either a) a number dialled onto the telephone set has no corresponding packet network address or b) the packet network is inactive.

27. A routing method as recited in claim 23, wherein said at least one preestablished routing rule includes an emergency call routing rule; said emergency call routing rule dictates that one of the telephone interface and the Local Area Network interface is to be routed to the telephone line interface when a number dialled onto the telephone set is an emergency number.

28. A routing method as recited in claim 23, wherein said at least one preestablished routing rule includes a database determined routing rule; said database determined routing rule dictates that a) one of the telephone interface and the Local Area Network interface is routed to the Local Area Network interface when a number dialled onto the telephone set is present in a database of the controller circuit; and b) one of the telephone interface and the Local Area Network interface is routed to the telephone line interface when a number dialled onto the telephone set is not present in the database.

29. A telephone to packet adapter for routing an outgoing call issued by a telephone set, said adapter consisting essentially of:
- a telephone line interface configured to be connected to a user's home telephone line;
- a telephone interface configured to be connected to the telephone set;
- a packet network interface configured to be connected to a packet network; and
- a controller circuit interconnecting said telephone line interface, said telephone interface and said packet network interface, wherein said controller circuit includes a telephone number database of telephone numbers that may be reached via the packet network
- wherein said controller circuit is configured to route said outgoing call to one of said telephone line and said packet network interfaces depending on at least one preestablished routing rule.

30. The adapter of claim 29, wherein said at least one preestablished routing rule is such that a) said outgoing call is routed to said telephone line interface when a dialed telephone number is a local call and b) said outgoing call is routed to said packet network interface when the dialed telephone number is not a local call.

31. The adapter of claim 29, wherein said at least one preestablished routing rule is such that said outgoing call is routed to said telephone line interface when no packet network address corresponding to a dialed telephone number exists.

32. The adapter of claim 29, wherein said at least one preestablished routing rule is such that a) said outgoing call is routed to said telephone line interface when a dialed telephone number is not present in said telephone number database and b) said outgoing call is routed to said packet network interface when the dialed telephone number is listed in said telephone number database.

33. The adapter of claim 29, wherein said at least one preestablished routing rule is such that said outgoing call is routed to said telephone line interface when said packet network is inactive.

34. The adapter of claim 29, wherein said at least one preestablished routing rule is such that said outgoing call is routed to said telephone line interface when a dialed telephone number is an emergency number.

* * * * *